United States Patent Office 3,098,863
Patented July 23, 1963

3,098,863
NICKEL AND COBALT CHELATES OF ORTHO-HYDROXYBENZOPHENONES
Rolf Dessauer, Wilmington, Del., and Sidney Benjamin Maerov, Kinston, N.C., assignors to E. I. du Pont de Nemours and Company, Wilmington, Del., a corporation of Delaware
No Drawing. Filed Oct. 15, 1959, Ser. No. 846,758
9 Claims. (Cl. 260—439)

This invention is directed to novel compositions of matter which are water-insoluble metal chelates of orthohydroxybenzophenones. More specifically, this invention deals with the nickel and cobalt chelates of hydroxy, lower alkyl, and lower alkoxy substituted benzophenones, which compounds find significant utility as pigments and dyes.

Metal chelates of organic ketones are known in the art. French Patent 1,090,246, for example, discloses a large number of metal chelates of ortho-hydroxy ketones which are used, after heating above their fusion point, as antiknock agents for gasoline. Among the many organometallic compounds disclosed in this patent are those of ortho-hydroxy acetophenones which are also used as antiknock agents. These agents, however, cannot be used successfully as dyes and pigments because of their poor tinctorial properties and extremely poor light-fastness.

It has now been discovered that a novel class of compounds comprising the nickel and cobalt chelates of hydroxy, lower alkyl and lower alkoxy substituted ortho-hydroxybenzophenones, which compounds have extremely good light-fastness and may be used effectively as dyes and pigments.

It is an object of the present invention to provide novel water-insoluble metal chelates. It is a further object of this invention to provide novel water-insoluble metal chelates of ortho-hydroxybenzophenones, which benzophenones have significant utility as pigments and dyes. It is another object of this invention to provide novel compounds possessing superior tinctorial properties and significant light-fastness when utilized as dyes and pigments. These and other objects will become apparent in the following description and claims.

More specifically, the present invention is directed to water-insoluble nickel and cobalt chelates of o-hydroxybenzophenones having the structure

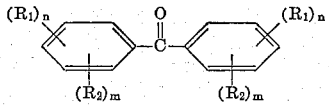

wherein $R_1$ and $R_2$ are H, OH, lower alkyl and lower alkoxy and may be the same or different, and $n$ and $m$ are integers of 1 and 2.

The novel compounds of the present invention can be prepared by adding an aqueous solution of a nickel or cobalt water-soluble salt to an agitated, heated (50° to 75° C.) aqueous-alcoholic alkaline solution of the benzophenone. After the addition of the metal salt solution, the metal chelate precipitates and is filtered off, washed and dried.

The benzophenones useful to give the metal chelates of this invention are ortho-hydroxybenzophenones having the structure

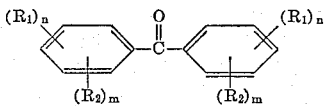

where $R_1$ and $R_2$ and H, OH, lower alkyl and lower alkoxy groups and may be the same or different, and $n$ and $m$ are integers 1 or 2. It will be understood that to obtain an ortho-hydroxybenzophenone at least one of the R groups will be an OH group which will be in a position ortho to the carbonyl group. Thus, compounds such as 2,4-dihydroxybenzophenone, 2-hydroxy-4-methoxybenzophenone, 2,2′,4-trihydroxybenzophenone, 2,2′-dihydroxy-4-methoxybenzophenone, 2,2′,4,4′-tetrahydroxybenzophenone, 2,2′-dihydroxy-4,4′-dimethoxybenzophenone, 5-tertiary-butyl-2,2′,4-trihydroxybenzophenone, tertiary-butyl-2,2′-dihydroxy-4-methoxybenzophenone, 3,5 - ditertiary-butyl-2,4-dihydroxybenzophenone, 2-hydroxy - 4 - ethoxybenzophenone, 2-hydroxy-4,4′-diethylbenzophenone, 2,2′-hydroxy-4-methoxy-4′-isopropylbenzophenone, 2,2′-dihydroxy-4-butoxybenzophenone, 5,5′-di-tertiary-butyl - 2,2′-dihydroxy-4,4′-dimethoxybenzophenone, 2,2′ - dihydroxy-4-methoxy-4′-ethoxybenzophenone, and the like are species of this invention.

These benzophenones are disclosed and their preparation given in the literature, e.g., U.S. Patents 2,693,492, 2,789,140, 2,853,523, 2,861,104 and 2,861,105.

The metal salt used to react with these benzophenones will be, as indicated, a water-soluble salt of nickel or cobalt. These will be added (preferably as an aqueous solution) and will include both inorganic and organic anions such as sulfates, nitrates, bromides, chlorides, acetates, formates, benzenesulfonates, benzoates, and the like.

The metal complexes of this invention will normally contain either one or two molecules of ortho-hydroxy benzophenone per atom of metal. In the former case, it is very likely that two atoms of the metal will be complexed with two molecules of the benzophenone, but the exact structural configuration is not known. In the cases where the complex contains two molecules of benzophenone per metal atom, the probable structure of the compounds is illustrated by the following formula:

(I)
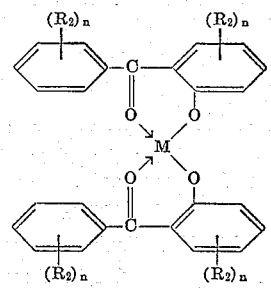

or
(II)
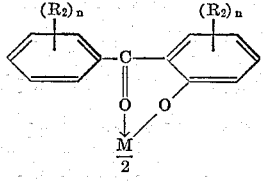

These novel compositions are colored solids, having high melting or decomposition points (i.e., on the order of 250° to 350° C.). These complexes are insoluble in water, but generally soluble in one or more of the usual organic solvents; e.g., alcohols such as methanol, ethanol, isopropanol, etc.; ketones such as acetone, methylethyl ketone; dimethylformamide, Cellosolve, pyridine, chloroform and the like. They are of value as pigments and dyes in numerous applications, but have particular value as dyes for plastics where they exhibit excellent light-fastness. For example, when about 0.5% to 2% of the colored complex is incorporated into a film such as cellulose acetate or polyvinylbutyral resin, the colored film shows a Fade-Ometer light-fastness over 1000 hours. On the other hand, if metal complexes of the prior art acetophenones are used in plastic films instead of the benzophenone complexes of this case, the light-fastness of the film is on the order of 20 to 50 hours. In addition, the acetophenones have poor color value and large amounts must be used to impart significant color value to the film.

Representative examples illustrating the present invention follow.

EXAMPLE 1

1:2 Nickel-2,4-Dihydroxybenzophenone

A clear solution was prepared by dissolving 4.1 g. (0.1 mole) sodium hydroxide in 200 cc. of distilled water and then adding with stirring 21.4 g. (0.1 mole) of 2,4-dihydroxybenzophenone and 50 cc. of methanol. Then over a period of one hour at 63–68° C., a solution of 13.15 g. (0.05 mole) nickel sulfate ($NiSO_4+6H_2O$) dissolved in 100 cc. of distilled water was added. After stirring for an additional half hour period at 65° C. the product precipitated out of the neutral solution as a pale greenish-yellow substance. This was filtered hot and the filter cake washed with 300 cc. of distilled water until the filtrate gave no further indication of nickel ions when tested with an alcoholic solution of dimethyl glyoxime. The crude product, after drying at 70° C., was obtained as a pale greenish-yellow powder in a yield of 23.4 g. or 92.6% of theory.

Analysis of the product for nickel indicated the 1:2 nickel complex. In methanol, the product exhibits an absorption maximum at a wavelength of 2920 A.

It is soluble in methanol, acetone, methylethyl ketone, dimethylformamide but insoluble in water.

EXAMPLE 2

1:2 Nickel-2-Hydroxy-4-Methoxybenzophenone

This compound was prepared by replacing the 2,4-dihydroxybenzophenone of Example 1 by 22.8 g. (0.1 mole) of 2-hydroxy-4-methoxybenzophenone. The product was obtained as a pale greenish-yellow powder (melting point 295–296° C.) in a yield of 25.5 g. or 96.8% of theory.

Analysis of the product indicated 11.2% of nickel which compares to a theoretical value of 11.46% for the 1:2 nickel complex. In dimethylformamide the substance exhibits an absorption maxima at wavelengths of 3200 A. and 3800 A.

It is soluble in acetone, methyl ethyl ketone, chloroform, dimethylformamide and pyridine but insoluble in water, ethanol or 28% ammonia.

EXAMPLE 3

1:2 Nickel-2,2',4-Trihydroxybenzophenone

This product was prepared by the same procedure as described in Example 1 by replacing the 2,4-dihydroxybenzophenone with a molar equivalent amount of 2,2',4-trihydroxybenzophenone (M.R. 131–132° C.). The product after vacuum drying at 50° C. was obtained as a bright greenish-yellow powder in a yield of 95.4% of theory.

By analysis, the product contained 11.5% of nickel, which compares to a theoretical value of 11.35% for the 1:2 nickel complex. The absorption maxima of the substance in dimethylformamide are at 2850 A., 3175 A. and 4000 A.

It is soluble in dimethylformamide, "Cellosolve" and pyridine, partly soluble in methylethyl ketone and chloroform and insoluble in water.

EXAMPLE 4

1:2 Nickel-2,2'-Dihydroxy-4-Methoxybenzophenone

The above substance was prepared by the same procedure as described in Example 1 by replacing the 2,4-dihydroxybenzophenone with a molar equivalent amount of 2,2'-dihydroxy-4-methoxybenzophenone (M.R. 65–66° C.). The product after drying at 70° C. was obtained as a bright greenish-yellow powder in a yield of 94% of theory.

By analysis the product contained 10.2% of nickel which compares to a theoretical value of 10.77% for the 1:2 nickel complex. The substance in methanol exhibits absorption maxima at 2350 A., 2830 A., 3100 A. and 4200 A.

It is soluble in acetone, methyl ethyl ketone, methanol and insoluble in water.

EXAMPLE 5

1:2 Nickel-2,2',4,4'-Tetrahydroxybenzophenone

The above substance was prepared by the same procedure as described in Example 1 by replacing the 2,4-dihydroxybenzophenone with 24.6 g. 0.1 mole) of 2,2',4,4'-tetrahydroxybenzophenone (M.R. 197–198° C.). The product after vacuum drying at 50° C. was obtained as a bright greenish-yellow powder in a yield of 20 grams. The product does not melt but chars above 300° C.

EXAMPLE 6

1:2 Nickel-2,2'-Dihydroxy-4,4'-Dimethoxybenzophenone

A clear solution was prepared by adding 27.4 g. (0.1 mole) of 2,2'-dihydroxy-4,4'-dimethoxybenzophenone to a solution of 4.1 g. (0.1 mole) sodium hydroxide dissolved in a mixture of 180 cc. distilled water and 100 cc. "Cellosolve." There was then added over a period of one hour at 65–70° C., a solution of 13.15 g. (0.05 mole) of nickel sulfate ($NiSO_4+6H_2O$) in 100 cc. of distilled water. After stirring for an additional 15 to 30 minute period at 65–70° C. the product precipitated out of the clear solution and was filtered hot. The filter cake was washed with 200 cc. of water until a test of the filtrate gave no indication of nickel ions. The crude product, after vacuum drying at 50° C., was a canary yellow powder. The yield was 28 g. which corresponds to a theoretical yield of 92.5%.

Analysis of the product indicated 10.3% of nickel which compares to a theoretical value of 9.7% for the 1:2 nickel complex.

The product is soluble in acetone, methyl ethyl ketone, "Cellosolve," chloroform, dimethylformamide and pyridine but insoluble in water. In dimethylformamide it exhibits absorption maxima at 2450 A., 2850 A., 3100 A. and 4100 A.

EXAMPLE 7

1:2 Nickel-Tert. Butyl-2,2',4-Trihydroxybenzophenone

The above compound was prepared by the procedure of Example 1 by replacing the 2,4-dihydroxybenzophenone with a molar equivalent amount of mono-tert-butyl-2,2',4-trihydroxybenzophenone. The product after vacuum drying at 50° C. was obtained as a bright yellow powder in a yield of 98.2% of theory.

By analysis, the product contained 9.6% of nickel which compares to a theoretical value of 9.34% for the 1:2 nickel complex. The 1:2 nickel-tert-butyl-2,2',4-trihydroxybenzophenone exhibits absorption maxima in methanol at 2930 A. and 4370 A.

It is soluble in methanol, acetone, methyl ethyl ketone and chloroform but insoluble in water.

EXAMPLE 8

1:2 Nickel-Tert-Butyl-2,2'-Dihydroxy-4-Methoxybenzophenone

This compound was prepared by the procedure of Example 1 by replacing the 2,4-dihydroxybenzophenone with a molar equivalent amount of mono-tert-butyl-2,2'-dihydroxy-4-methoxybenzophenone. The product, after vacuum drying at 50° C., was obtained as a bright greenish-yellow powder in a yield of 89.2% of theory.

By analysis, the product contained 8.50% of nickel which compares to a theoretical value of 8.93% for the 1:2 nickel complex. The substance in methanol exhibits absorption maxima at 2350 A., 2850 A. and 3300 A.

It is soluble in methanol, acetone, methyl ethyl ketone, chloroform but insoluble in isooctane or water.

EXAMPLE 9

1:2 Nickel-Tert-Butyl-2-Hydroxy-4-Methoxybenzophenone

The above substance was prepared by the procedure of Example 1 by replacing the 2,4-dihydroxybenzophenone by an equivalent molar amount of mono-tert-butyl-2-hydroxy-4-methoxybenzophenone. The product, after drying at 70° C., was obtained as a greenish-yellow powder in a yield of 97.9% of theory.

By analysis, the product contained 9.2% of nickel which compares to a theoretical value of 9.4% for the 1:2 nickel complex. The substance in methanol exhibits absorption maxima at 2430A., 2900 A., 3300 A. and 3900 A.

It is soluble in methanol, ethanol, acetone, methyl ethyl ketone and dimethylformamide.

EXAMPLE 10

1:2 Nickel-Tert-Butyl-2,4-Dihydroxybenzophenone

The compound above was prepared by the procedure of Example 1 by replacing the 2,4-dihydroxybenzophenone with an equivalent molar amount of di-tert-butyl-2,4-dihydroxybenzophenone. The product, after drying at 70° C., was obtained as a soft greenish-yellow powder in theoretical yield.

By analysis the substance contained 8.2% of nickel which compares to a theoretical value of 8.29% for the 1:2 nickel complex. The substance in methanol exhibits absorption maxima at 2450 A., 2950 A. and 3400 A.

It is soluble in methanol, isopropanol, acetone and methylethyl ketone but insoluble in water.

EXAMPLE 11

1:1 Nickel-2,2',4,4'-Tetrahydroxybenzophenone

A clear solution was prepared by dissolving with stirring 12.4 g. (0.3 mole) of sodium hydroxide in 180 cc. of distilled water and then adding 37 g. (0.15 mole) of 2,2',4,4'-tetrahydroxybenzophenone and 75 cc. of methanol. Then, there was added over a period of one hour at 23–26° C. a solution of 39.5 g. of nickel sulfate (NiSO$_4$+6H$_2$O) in 120 cc. of distilled water. A fine greenish-yellow precipitate separated. After stirring for one-half hour longer at room temperature the produce was filtered off and the filter cake was washed with 300 cc. of 15% methanol, and dried at 70° C. to give as the tetrahydrate, a greenish-yellow powder in a yield of 44 g. which corresponds to 85.6% of theory.

The product contained 17.2% of nickel which compares to a theoretical value of 17.43% for the 1:1 nickel complex. In 1 to 1 methanol-dimethylformamide mixed solvent the substance exhibits absorption maxima at 2750 A., 3100 A. and 3900 A.

It is soluble in dimethylformamide and sparingly soluble in "Cellosolve," methanol, ethanol and insoluble in acetone, benzene or water.

EXAMPLE 12

1:1 Nickel-2,2'-Dihydroxy-4,4'-Dimethoxybenzophenone

A solution was prepared by dissolving 8.2 g. (0.2 mole) of sodium hydroxide in 180 cc. distilled water and adding 27.4 g. (0.1 mole) of 2,2'-dihydroxy-4,4'-dimethoxybenzophenone and 30 cc. of "Cellosolve." Then, there was added over a period of ½ hour at 65–67° C. a solution of 26.3 g. of nickel sulfate (NiSO$_4$+6H$_2$O) in 120 cc. of distilled water. After stirring 15 minutes at 60°–65° C., the bright greenish-yellow precipitate which separated out was filtered hot and the filter cake was washed with 250 cc. of warm water and dried under vacuum at 50° C. The product was obtained as a bright yellow powder in a yield of 24 g. which corresponds to a theoretical yield of 99.2%.

The product contained 17.1% of nickel which corresponds to a theoretical value of 17.74% for the 1:1 nickel complex. In dimethylformamide the substance exhibits absorption maxima at 2550 A., 2775 A., 3100 A. and 4100 A.

The substance is soluble in dimethylformamide, pyridine, sparingly soluble in acetone, methyl ethyl ketone, chloroform or "Cellosolve" and insoluble in methanol, isooctane or water.

EXAMPLE 13

1:1 Cobalt-2,2',4,4'-Tetrahydroxybenzophenone

A solution of 72 g. (0.3 mole) cobalt chloride (CoCl$_2$+6H$_2$O) in 200 cc. of distilled water was prepared and to it was added over a period of one hour at room temperature a solution of 12.4 g. (0.3 mole) of sodium hydroxide, 37 g. (0.15 mole) of 2,2',4,4'-tetrahydroxybenzophenone, and 75 cc. of methanol in 180 cc. of water. The product separated out as a yellow-orange material. After stirring for an additional one hour at room temperature, the product was filtered, washed with 300 cc. of distilled water until a test of the filtrate gave no further indication of cobalt ions with sodium cyanate test solution (blue color). The product after vacuum drying at 50° C. was obtained as a deep yellow-orange powder in a yield of 46 g. which corresponds to a theoretical yield of 99.4%.

The product contained 19.20% of cobalt which corresponds to a theoretical value of 19.46% for the 1:1 cobalt complex. In a mixed methanol-pyridine (1–1) solvent the substance exhibits absorption maxima at 2950 A. and 3400 A.

It is soluble in pyridine, sparingly soluble in acetone, methyl ethyl ketone or dimethylformamide and insoluble in water.

EXAMPLE 14

1:1 Cobalt-2,2'-Dihydroxy-4,4'-Dimethoxybenzophenone

A solution was prepared in 180 cc. of water containing 12.4 g. (0.3 mole) of sodium hydroxide, 41 g. (0.15 mole) of 2,2'-dihydroxy-4,4'-dimethoxybenzophenone and 75 cc. of methanol. Then, there was added with stirring a solution of 36 g. (0.15 mole) of cobalt chloride (CoCl$_2$+6H$_2$O) in 120 cc. of distilled water. The product precipitated out as a yellow-orange powder which after stirring for an additional hour at room temperature was filtered off and the cake washed with 200 cc. of 15% methanol. The product was vacuum dried at 50° C. and was obtained as a yellow-orange powder in a yield of 50 g. which corresponds to a theoretical yield of 98%.

The product by analysis contained 17.3% of cobalt which corresponds to a theoretical value of 17.82% for the 1:1 cobalt complex. In a mixed methanol-dimethylformamide (1–1) solvent the substance exhibits adsorption maxima at 2800 A., 3300 A. and 4000 A.

It is soluble in pyridine and dimethylformamide, sparingly soluble in "Cellosolve" or methyl ethyl ketone and insoluble in water.

EXAMPLE 15

Following the details of Example 1, 35.8 g. of 5,5'-di-tert-butyl-tetrahydroxybenzophenone was substituted for the 2,4-dihydroxybenzophenone. A greenish-yellow powder was obtained which was shown by analysis to contain one nickel atom per two molecules of the benzophenone.

EXAMPLE 16

A solution was prepared consisting of 0.1 part of the nickel complex of Example 9, 1 part of cellulose acetate and 0.5 part of dimethylformamide. The clear solution was cast as a film of 0.015 inch in thickness. The yellow film was exposed to a Fade-Ometer and showed no visible discoloration after 2000 hours.

In a like manner, films made with the compositions of Examples 1, 2 and 8 showed no discoloration after 500 hours in a Fade-Ometer.

EXAMPLE 17

A solution consisting of 380 parts of ethanol, 72 parts of polyvinylbutyral resin, 31.5 parts of a glycol ester plasticizer, and 0.25 part of the cobalt complex of Example 14. This was cast on a glass plate and the solvent allowed to evaporate to form a film. Then another glass plate was placed on the film and the sandwich laminated at 190° C. After 1000 hours in a Fade-Ometer there was no visible color change.

The novel compounds of the present invention are also very useful as agents for improving the light-fastness of other dyes, particularly basic dyes, on dyed fabrics. For example, in the absence of any modifier, fuchsin dye exhibits very poor light-fastness on fabrics composed of polyethylene terephthalate/5-(sodium sulfo)isophthalate (98/2). However, when the dyed fabric is treated with an aqueous dispersion of the nickel complex of Example 12 (2% of the nickel complex, based on fabric weight), the light-fastness is increased many-fold with respect to a dyed control fabric on which none of the nickel complex is used.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Water insoluble metal chelates of ortho-hydroxybenzophenones, said metal being taken from the group consisting of nickel and cobalt, and said ortho-hydroxybenzophenone having the structure

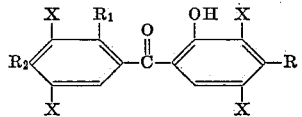

wherein X is a radical selected from the group consisting of hydrogen and $C_1$ to $C_4$ alkyl, and wherein R, $R_1$ and $R_2$ each represent a radical selected from the group consisting of hydrogen, hydroxy and $C_1$ to $C_4$ alkoxy, with the proviso that at least one of the radicals R, $R_1$ and $R_2$ is selected from the group consisting of hydroxy and $C_1$ to $C_4$ alkoxy radicals.

2. A water insoluble metal chelate structure according to claim 1 wherein R is a hydroxy radical.
3. A water insoluble metal chelate structure according to claim 1 wherein R is a $C_1$ to $C_4$ alkoxy radical.
4. A water insoluble metal chelate structure according to claim 1 wherein $R_1$ is hydroxy.
5. A nickel chelate of tertiary-butyl-2,2'-dihydroxy-4-methoxybenzophenone.
6. A nickel chelate of 2,2',4,4'-tetrahydroxybenzophenone.
7. A nickel chelate of 2,2'-dihydroxy-4,4'-dimethoxybenzophenone.
8. A cobalt chelate of 2,2'-dihydroxy-4,4'-dimethoxybenzophenone.
9. A nickel chelate of tertiary-butyl-2-hydroxy-4-methoxybenzophenone.

References Cited in the file of this patent

UNITED STATES PATENTS

| | | |
|---|---|---|
| 2,810,753 | Bersworth | Oct. 22, 1957 |
| 2,853,521 | Hardy et al. | Sept. 23, 1958 |

OTHER REFERENCES

Martell et al.: "Chemistry of the Metal Chelate Compounds," page 423 (1956).

Wertheim: Organic Chemistry, third edition, page 623 (1951).

Zetzsche et al.: Justus Liebig's Annalen der Chemie, 445, 283–296 (1925).